Patented Mar. 4, 1924.

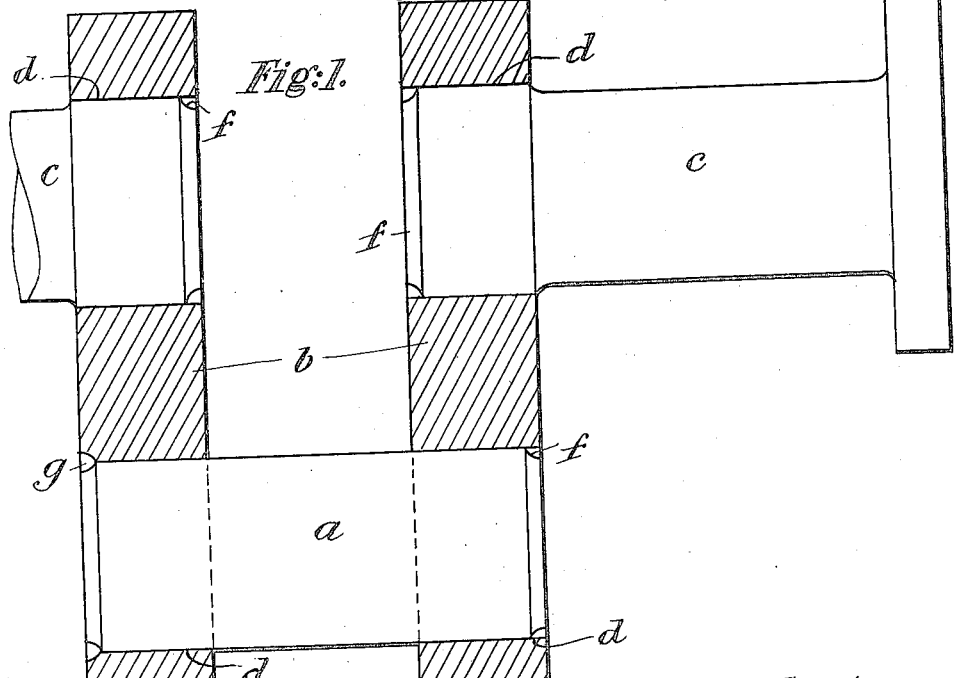
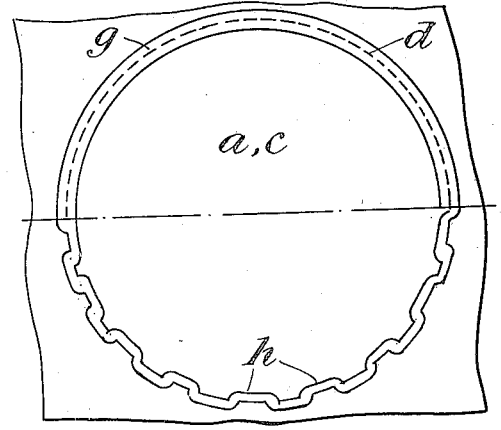
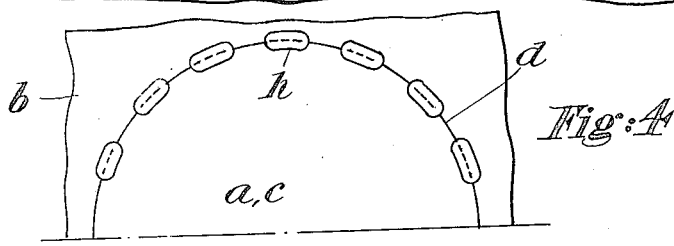

1,485,645

UNITED STATES PATENT OFFICE.

JOHN TINDALE, OF SUNDERLAND, ENGLAND.

CRANK SHAFT AND THE MANUFACTURE THEREOF.

Application filed March 5, 1923. Serial No. 623,033.

*To all whom it may concern:*

Be it known that I, JOHN TINDALE, residing at Sunderland, in the county of Durham, England, a subject of the King of Great Britain and Ireland, have invented certain new and useful Improvements in Crank Shafts and the Manufacture Thereof, of which the following is a specification.

This invention relates to the construction of crank shafts.

The principal constructions of the crank shafts now in general use are: (1) the solid shaft in which the shaft, the crank webs and the crank pin are manufactured of one piece of metal; (2) the built shaft in which the shaft ends, the crank web or webs and the crank pin are manufactured from separate pieces of metal, the shaft ends and crank pin being shrunk or pressed into the webs throughout their entire axial width and supplemented in some cases by keys; and (3) the semi-built shaft in which the webs and crank pins are manufactured in one piece of metal and the shaft ends are shrunk or pressed into the webs and it may be keyed.

In a solid shaft, it is permissible for the width of webs in an axial direction to be less than in the built types and consequently, for a given axial length between the outside flanks of both webs, there is a maximum allowable length for the crank pin journal. The junction between the crank pin and the web or webs is, however, a recognized zone of possible weakness because of the more or less inefficient disposition of the stress lines of resistance, and also because of the tendency to minimize the fillet or radius at the junction of the pin and the web in order to obtain the greatest effective length of journal or area of bearing surface on the crank pin for a given length over the webs.

Experience has proved the built types to be superior to the solid type, especially in marine engine practice, and particularly in the case of internal combustion engines in which the loads and possible shocks may at times be sudden and very severe. The required width of the webs, however, is greater, and for a given distance over both webs the crank pin journal is shortened, but the type permits of a better disposition of the stress lines of resistance at the junction of the crank pin and the web than in the solid type.

The manufacture of built types of crank shaft involves shrinkage or some analogous process; and therefore, to achieve a high standard of resistance to movement at the joint, uniformly excellent workmanship is imperative. Moreover where keys or dowels are driven into place, there is a tendency to separate the jointed parts locally and thus weaken their resistance to relative movement. These disadvantages have been amply demonstrated in practice, and the inability of this method of manufacture to adequately meet the demands of practice has been established, particularly with regard to the maintenance of the true alignment of the parts on shipboard, as even a small movement between the jointed surfaces causes a disturbance in efficiency of the journals, this defect being often in evidence in the aftermost crank of a multiple crank engine on shipboard.

The object of my invention is to advance or improve the art of crank shaft construction, and in particular to eliminate or minimize the defects and practical disadvantages inherent in the solid and built type constructions and as hereinbefore described.

According to the invention, circular grooves or recesses are formed at the end or ends of the web bore either in the shaft, or contiguously in both the shaft and the web, and said grooves or recesses may be in the form of a complete annulus or a series of recesses and are filled in by electric or other system of welding so that the parts will be positively united and locked against relative movement. In effecting the weld, molten welding material is preferably used to fill the grooves, but, if desired, the weld could be made by the heat causing some of the material of the web or of the shaft, or both, to be melted and run together.

The invention is illustrated in the accompanying drawings, in which:—

Fig. 1 shows in sectional elevation a part of a built-up crank-shaft of which the component parts are connected according to the invention, and Figs. 2, 3 and 4 show in end view to a larger scale several alternative methods of grooving the members to be connected.

Referring to the drawings, *a* designates the crank pin; *b* the crank webs; *c* the shaft journals and *d* the bores in the webs. Circular grooves are formed at the ends of the web bore in the web as shown at *e* in the shaft or crank pin as at $f$, or contiguously in both the web and the shaft or crank pin as shown at $g$.

These grooves may be in the form of a complete annulus as shown in Fig. 1 and the upper half of Fig. 2 or they may be interrupted to form segments or spaced recesses $h$ disposed circumferentially as shown in the lower half of Fig. 2 and in Figs. 3 and 4, these recesses being formed either in one member only as shown at the top half of Fig. 3 or in both members and relatively staggered and separated as shown in the lower half of Fig. 3; or again they may be contiguous and opposite as shown in Fig. 4 or relatively staggered and overlapping as shown in the lower half of Fig. 2 to afford a continuous joint.

The grooves or recesses may be either on one or both sides of the web.

After the component parts of the shaft are fitted together the grooves or recesses are filled in by electric or other system of welding, this method of connection being used alone, or in conjunction with shrinking or otherwise connecting the parts. The actual filling may take place according to either of the two methods previously mentioned.

In order to avoid weakening the parts of the shaft by such welding, the diameter of the shaft or pin may be increased where it enters the web, or the shaft or pin may be increased in diameter beyond normal for the whole of its length.

It will be understood from the foregoing that the longitudinal parts of the shaft are connected to the webs solely at the free outer edges of the said longitudinal parts. This method of connection will give a certain amount of capacity for twist throughout the whole length of the crank pin or shaft portion up to the very ends thereof, so that there will be a free twistable length about double that allowed by existing conditions. This is important when the invention is applied to Diesel engines in which the loads and possible shocks may at times be sudden and very severe, because the tendency of the jointed parts to separate locally and thus weaken their resistance to relative movement is overcome.

What I claim as my invention and desire to secure by Letters Patent of the United States is:—

1. The method of rigidly connecting the component parts of a built-up crank shaft embodying perforated webs and longitudinal parts, which consists in securing the longitudinal parts of the shaft in the perforations of the webs solely along the free end edges of said parts; substantially as described.

2. The method of rigidly connecting the component parts of a built-up crank shaft embodying perforated webs and longitudinal parts, which comprises forming grooves along the meeting lines of the perforations of the webs with the free end edges of the longitudinal parts of the shaft, inserting said longitudinal parts in said perforations, and closing said grooves by welding; substantially as described.

3. A built-up crank shaft embodying a pair of webs having alining transverse perforations, and longitudinal parts inserted at their ends in said perforations; the meeting lines of the perforations with the free end edges of said longitudinal parts having grooves formed therealong, and welding metal filling said grooves to rigidly connect said webs and parts together; substantially as described.

4. A built-up crank shaft embodying a pair of webs having alining transverse perforations, and longitudinal parts inserted at their ends in said perforations; said longitudinal parts being rigidly connected to the webs solely along the meeting lines of the perforations with the free end edges of the parts; substantially as described.

5. A built-up crank shaft embodying a pair of webs having alining transverse perforations, and longitudinal parts inserted at their ends in said perforations; said longitudinal parts being welded to the webs solely along the meeting lines of the perforations with the free end edges of the parts; substantially as described.

In witness whereof I have signed this specification.

J. TINDALE.

Witnesses:
C. A. WALTER,
GEO. C. BOLTON.